United States Patent
Eisenhardt et al.

[15] 3,642,333
[45] Feb. 15, 1972

[54] CLAMP

[72] Inventors: Fred W. Eisenhardt; Hartley N. Ellingson, both of Fargo, N. Dak.

[73] Assignee: Alloway Manufacturing, Inc., Fargo, N. Dak.

[22] Filed: June 22, 1970

[21] Appl. No.: 48,258

[52] U.S. Cl. ........................................... 306/1.5, 172/763
[51] Int. Cl. ........................................................ A01b 15/12
[58] Field of Search ................... 306/1.5; 287/54 A, 54 B; 172/763

[56] References Cited

UNITED STATES PATENTS

| | | | |
|---|---|---|---|
| 3,550,969 | 12/1970 | Robinson | 306/1.5 |
| 856,200 | 6/1907 | Allin | 306/1.5 |
| 1,097,299 | 5/1914 | Carlson | 306/1.5 |
| 1,463,353 | 7/1923 | White | 306/1.5 |
| 1,863,970 | 6/1932 | Donald | 287/54 A |
| 2,259,890 | 10/1941 | Hipple | 287/54 B UX |
| 2,873,149 | 2/1959 | Redetzke | 306/1.5 |

*Primary Examiner*—Andrew V. Kundrat
*Attorney*—Burd, Braddock & Bartz

[57] ABSTRACT

A tool bar clamp for connecting a standard of an earth-working toolholder to a support, as a tool bar of a cultivator. The clamp has a body with a passageway for receiving a portion of the standard. A first pair of nut and bolt assemblies, engageable with the forward edge of the standard, clamp the standard against the back of the body. A second pair of nut and bolt assemblies, mounted on the side of the body, clamp the side of the standard in the body to fix the lateral and perpendicular position of the standard in the clamp. The body is mounted on the support with a retainer and a pair of nut and bolt assemblies.

15 Claims, 5 Drawing Figures

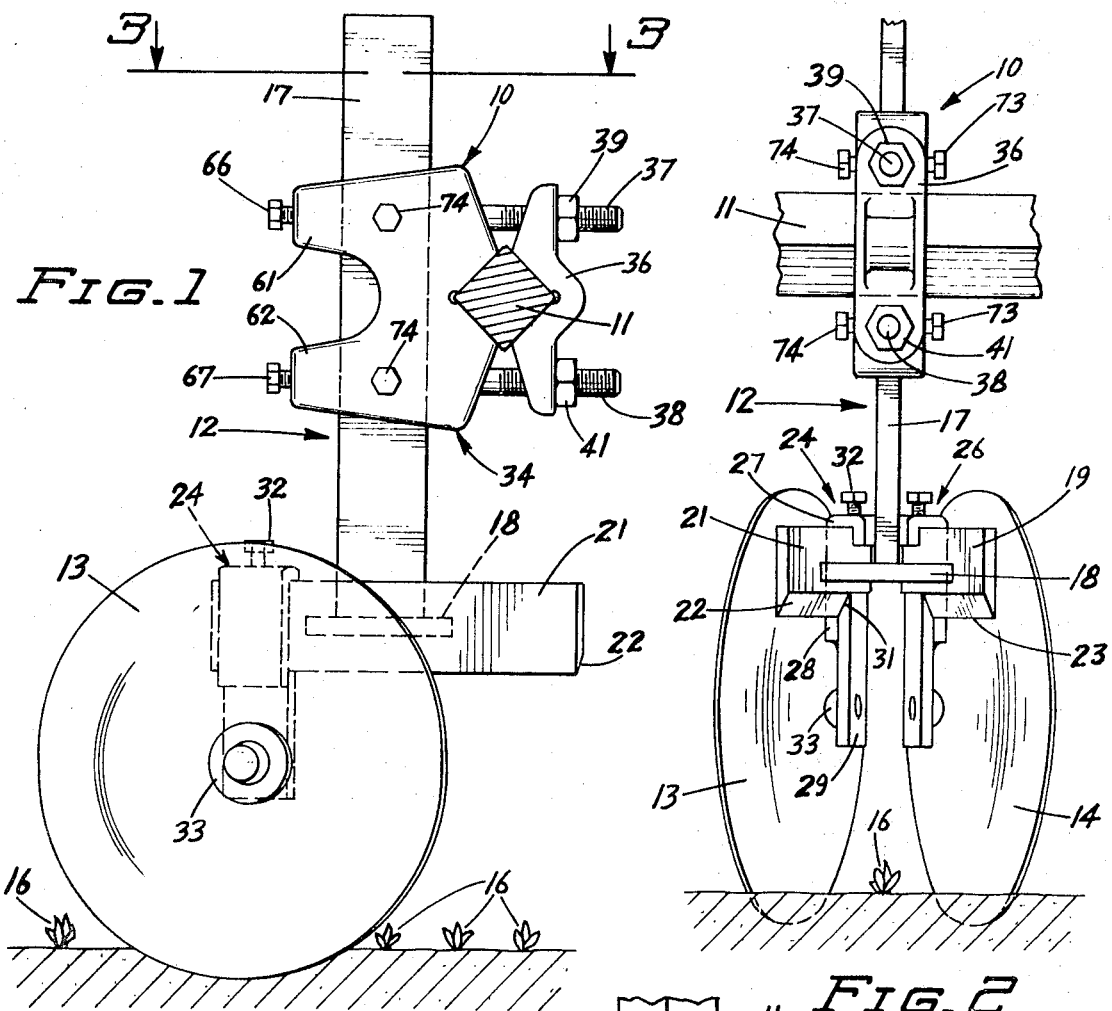
Fig.1
Fig.2
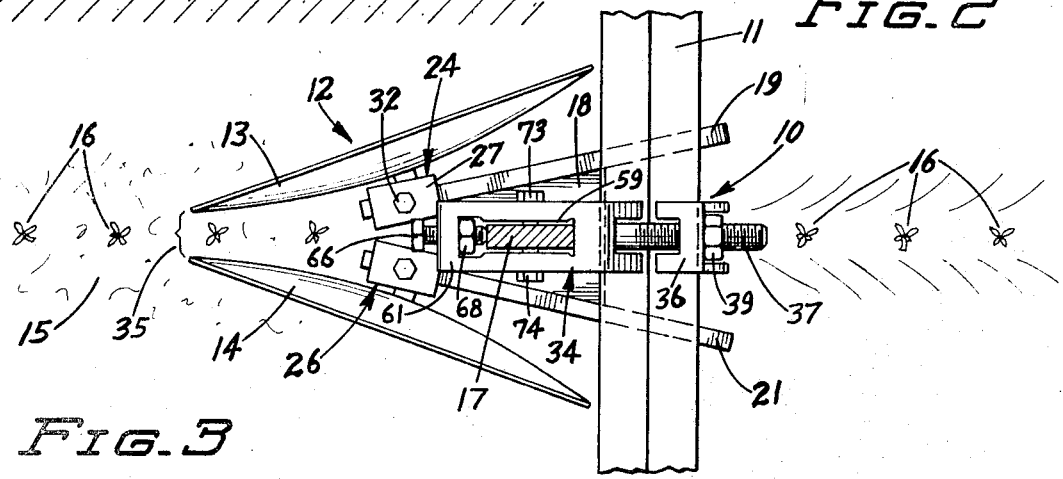
Fig.3
INVENTORS
FRED W. EISENHARDT
HARTLEY N. ELLINGSON
BY
Burd, Braddock & Bartz
ATTORNEYS INVENTORS
FRED W. EISENHARDT
HARTLEY N. ELLINGSON
BY Burd, Braddock & Bartz
ATTORNEYS

CLAMP

BACKGROUND OF THE INVENTION

Row crop cultivators, mounted on agricultural tractors, have a transverse tool bar carrying a plurality of earth-working tools to cultivate the soil between the rows of crops. When a single cultivator is used with a plurality of rows of crops, the earth working tools must be mounted on the cultivator tool bar with precision and in fixed positions to minimize the damage and destruction of the crops. Numerous types of clamps have been devised to connect the standard of an earth working tool to a tool bar. These clamps utilize nut and bolt assemblies to releasably mount the standard on the clamp. Examples of this type of clamp are shown in U.S. Pat. No. 2,873,149 and U.S. Pat. NO. 3,157,415. The standards in these clamps are only clamped in the longitudinal direction. They can move and tilt in use and thus alter the cultivating position of the earth-working tool. In precision cultivating where small distances of the earth working tool relative to the rows of crops is important, the tilting or lateral shifting of the standard is undesirable, as the standard must be constantly checked and adjusted to insure proper alignment of the earth working tools with the rows of crops.

SUMMARY OF THE INVENTION

The invention broadly relates to a clamp or connecting structure for coupling a member to a support. The clamp has a body including a back, sides connected to and extended from the back, and leg portions joined to the sides opposite the back. The sides are spaced from each other to form a passageway for receiving a portion of the member. The member is retained in the body in a fixed position with a first holding means and a second holding means engaging separate portions of the member. The first holding means comprise nut and bolt assemblies engageable with the leg portions of the body and the member for holding the member in engagement with the back. The second holding means comprise nut and bolt assemblies associated with at least one side of the member for holding the member in a fixed position relative to the body.

The body is connected to the support with retaining members and additional nut and bolt assemblies. All of the nut and bolt assemblies are removably mounted on the body so that they can be replaced.

The clamp is suitable for holding a shank of an earth-working tool holder in a fixed perpendicular position. The shank is prevented from tilting or laterally moving by the second holding means which clamp the shank in a direction generally normal to the first holding means. This insures the selected location of the earth-working tools, as discs, relative the rows of crops to be cultivated.

An object of the invention is to provide a clamp that holds a tool standard in a fixed vertical and a fixed lateral position. A further object of the invention is to provide a clamp which can be easily and cheaply manufactured without machining and which uses standard nut and bolt assemblies to attach the clamp to a tool bar and hold a tool holder shank in a fixed perpendicular position.

IN THE DRAWINGS

FIG. 1 is a side elevational view of the tool bar clamp of the invention in assembled relation with a transverse tool bar and an earth-working tool holder;

FIG. 2 is a rear elevational view of the structure shown in FIG. 1;

FIG. 3 is a sectional view taken along the line 3—3 of FIG. 1;

Figure 4:
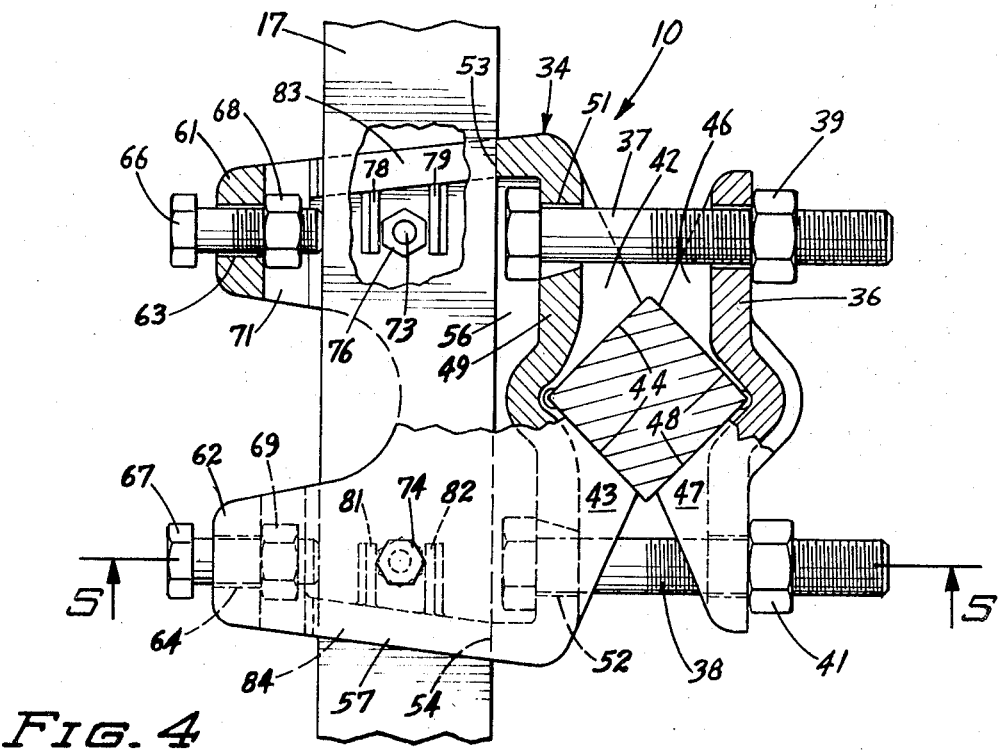
FIG. 4 is an enlarged side elevational view, partly sectioned, of the tool bar clamp of the invention.

Referring to the drawings, there is shown in FIGS 1 to 3 the tool bar clamp of the invention, indicated generally at 10, mounted on a transverse tool bar 11 of a row crop cultivator. Tool bar 11 is substantially square in cross section and has a length sufficient to carry a plurality of earth-working tools. Tool bars of this type are generally used in mounted relationship on three point hitches of farm tractors. An example of this type of multirow crop implement is shown in copending U.S. Pat. application, Ser. No. 5,056 entitled Row Crop Cultivator. Other types of row crop cultivators, plowing implements, seeding and planting implements fertilizer and herbicide units and the like, can be attached to a tool bar with the clamp of the invention. The following description is limited to a clamp for attaching a tool holder, indicated generally at 12, to the tool bar 11.

Tool holder 12 carries a pair of earth-working discs 13 and 14 for turning and working the soil 15 on opposite sides of the row of crops 16, as beets, beans, corn and the like. Tool holder 12 has an upright standard or shank 17 and a horizontal trapezoidal-shaped plate 18 secured to the bottom of the standard. The standard 17 and plate 18 form a generally inverted T-shaped member. Secured to the outer sides of the plate 18 are horizontal arms 19 and 21 which converge toward each other in a forward direction. The arms 19 and 21 are longer than the plate 18, with the forward portions of the arms extending beyond the front of the plate and the rear portions of the arms extending beyond the front of the plate and the rear portions of the arms extending beyond the front of the plate and the rear portions of the arms extending beyond the rear edge of the plate.

The lower edges 22 and 23 of the arms 19 and 21, respectively, are beveled or tapered downwardly and outwardly. Mounted on the arms 19 and 21 are adjustable clamps, indicated generally at 24 and 26, for carrying the discs 13 and 14. The clamps are identical in structure. Accordingly, the following description is limited to clamp 24. Clamp 24 has a top downwardly open hook portion 27 extended over the top of the arm 21 and a body 28 located along the outside of arm 21. Secured to the lower portion of body 28 is a leg 29. The leg 29 has an upwardly directed toe 31 having an upwardly and outwardly beveled edge forming a pocket for receiving the lowered beveled edge 22 of the arm 21. A bolt 32, threaded through the top of hook 27, engages the top of the arm 21 to fix and hold the position of the clamp 24 on the arm. Attached to the lower end of leg 29 is a bearing and axle unit 33 for rotatably mounting the disc 13 on the leg 29. The leg 29 can be provided with a twist about a vertical axis to fix the angular working pitch of the disc 13. Clamps with different types of pitches can be used to provide for a change in the working angle or pitch of the disc 13.

As shown in FIG. 3 of the drawings, the lateral space or mouth 34 between the leading edges of the discs 13 and 14 is relatively small. This requires an adjustment which must be maintained during the cultivation to prevent damage and destruction of the crops. To insure accurate location of the discs 13 and 14 relative to the row of crops, the tool holder 12 must be held in a fixed vertical and lateral position. This is accomplished with the tool bar clamp 10 of the invention.

Tool bar clamp 10 has a body or casting, indicated generally at 34, and a retaining member 36. A pair of bolts 37 and 38 couple the body to the retaining member 36 adjacent opposite sides of the transverse tool bar 11. Nuts 39 and 41, threaded on the bolts 37 and 38, respectively, clamp the back of the body 34 and the retaining member 36 on the tool bar 11. The body 34 has two pairs of ears 42 and 43 spaced from each other with a right angle recess 44 for receiving adjacent sides of the tool bar 12. The retaining member 36 has corresponding pairs of ears 46 and 47 spaced with a right angle recess 48. The ears 46 and 47 are in engagement with adjacent sides of the tool bar 12 and prevent rotation of the body 34 relative to the tool bar.

The ears 42 and 43 extend outwardly from a back 49 having a pair of holes 51 and 52 for accommodating the bolts 37 and 38. The holes 51 and 52 are slightly elongated and tapered in an inward direction permitting the bolts 37 and 38 to be removed from the body. Opposite edges of the back 49 have aligned transverse surfaces or faces 53 and 54 engageable with the forward edge of the standard 17. The body 49, between the faces 53 and 54, has a recess or cavity 56 for the heads of the bolts 37 and 38 so that the heads do not engage the standard.

Extended from the back 49 are spaced sides 57 and 58 forming with the back 49 a generally upright passageway 59 for the standard 17. Upper and lower portions of the sides 57 and 58 extend rearwardly into legs 61 and 62 which join the sides together. The legs 61 and 62 have holes 63 and 64, respectively, aligned with the holes 51 and 52 in the back 49.

A first pair of holding or clamping bolts 66 and 67 extend through the holes 63 and 64 and engage the outer edge of the standard 17. Nuts 68 and 69, located within the legs between the sides 57 and 58, are threaded onto the bolts 66 and 67 so that the bolts 66 and 67 function to hold or clamp the standard 17 in engagement with the faces 53 and 54. The nuts 68 and 69 are located between inwardly directed shoulder 71 and 72 with a loose fit so that the nuts can be removed from the legs. The shoulders prevent rotation of the nuts 68 and 69, whereby the bolts 66 and 67 can be adjusted relative to the legs.

Figure 5:
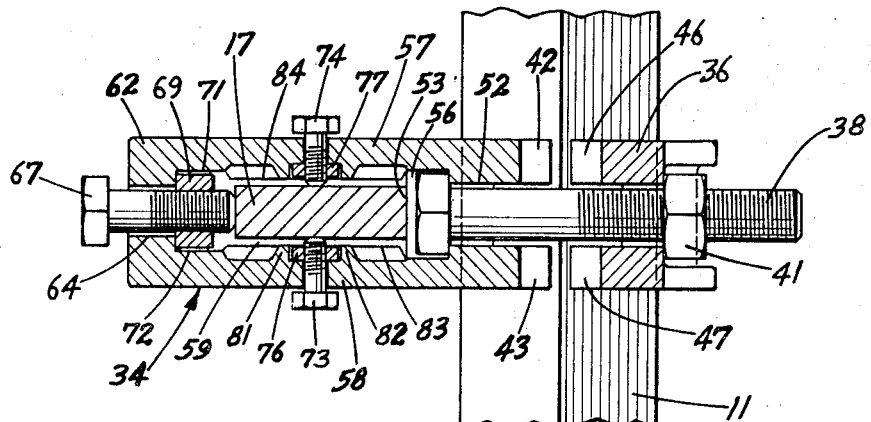
FIG. 5 is a sectional view taken along the line 5—5 of FIG. 4.

A second pair of lateral, side holding or clamping bolts 73 and 74, in the sides 57 and 58, are used to adjust the lateral or sideward position of the standard 17. The bolts 73 and 74, as shown in FIG. 5, extend through suitable holes in the sides 57 and 58 and are threaded into nuts 76 and 77. The nuts are located between parallel spaced ribs 78 and 79 and 81 and 82, respectively. The ribs are spaced from each other a distance substantially equal to the width of the nuts so that they hold the nuts from turning. Located adjacent the outer edges of the pairs of ribs 78, 79, 81 and 82 along the inside of the sides are flat shoulders 83 and 84 which have substantially flat faces facing the opposite sides of the standard 17. One pair of second holding bolts in one side of the body can be used to hold the standard in engagement with the opposite flat shoulders. This insures perpendicular alignment of the standard with the body of the clamp.

In use, the nut and bolt assemblies 37, 39 and 38, 41 clamp the body 34 and retaining member 36 about the tool bar 11 in a position in general vertical alignment with a row of crops 16. This positions the upright passageway 59 vertically above the row to accommodate the standard 17. The working depth of the earth-working discs 13 and 14 can be adjusted by changing the position of the standard 17 relative to the body 34. The first pair of holding bolts 66 and 67 engage the forward edge of the standard 17 to longitudinally clamp the standard 17 in the body 34. The bolts 66 and 67 hold the standard 17 in engagement with the shoulders 53 and 54, as shown in FIG. 4. The nuts 68 and 69 are held captive between the shoulders 71 and 72 and the legs 61 and 62.

The standard 17 is also clamped in a sideward or lateral direction by the pairs of bolts 73 and 74. These bolts are used to correct the lateral tilting of the standard 17 and prevent any sideward movement of the standard 17 which would alter the cultivating positions of the discs 13 and 14 relative to the row of crops 16. Bolts 73 and 74 function to maintain the perpendicular position of the standard 17 relative to the tool bar 11 and row of crops. A single pair of lateral bolts, as bolts 74, can be used to hold the standard 17 in engagement with the side shoulders 83. The nuts 76 and 77, being captive between their adjacent ribs, anchor the bolts on the sides 57 and 58 so that the holes through the body 28 are smooth, thereby eliminating the additional machining of the body and special repairs.

The bolts 37 and 38 can be removed from the body 34 by first initially removing the nuts 39 and 41 and the retainer 36. The bolts then are tilted so that the heads of the bolts slide through the passageway into the space between the legs 61 and 62. In this manner, conventional nut and bolt assemblies can be used to clamp the body 34 and retaining member 36 to the tool bar 11. The bolts 66, 67, 73 and 74 can be removed from the body by turning them off of their respective nuts. The nuts are free to be separated from the body.

While there has been shown and described a tool bar clamp in association with a dual disc tool holder, it is understood that other types of tool holders, tool implements or devices can be attached to a support by the clamp of the invention. The body 34 is preferably formed as a one-piece metal casting. It can be a welded fabricated member or made from other structural material, as reinforced plastic. It is understood that various other changes and substitutions and deletions may be made by those skilled in the art without departing from the spirit and scope of the invention.

The embodiments of the invention in which an exclusive property or privilege is claimed are defined as follows:

1. A clamp for connecting a member to a support comprising: a body including a back, sides connected to and extended from the back, spaced leg portions connected to the sides opposite the back, and a passageway for receiving a portion of the member between the sides, back and leg portions, first holding means engageable with the leg portions and the member for holding the member in engagement with the back, said first holding means comprising separate nut and bolt assemblies having bolts projected through holes in the leg portions and nuts on the inside of the leg portions between spaced shoulders which limit rotation of the nuts, and second holding means engageable with at least one side and the member for holding the member in a fixed position relative to the body, and means for connecting the body to the support.

2. The clamp of claim 1 wherein: the second holding means comprise nut and bolt assemblies having bolts projected through holes in said one side and nuts on the inside of the one side, said bolts engaging the side of the member.

3. A clamp for connecting a member to a support comprising: a body including a back, sides connected to and extended from the back, leg portions connected to the sides opposite the back, and a passageway for receiving a portion of the member between the sides, back and leg portions, first holding means engageable with the leg portions and the member for holding the member in engagement with the back and second holding means engageable with at least one side and the member for holding the member in a fixed position relative to the body, and means for connecting the body to the support, said means for connecting the body to the support comprising a retaining member and nut and bolt assemblies coupling the retaining member to the body with the support located between the retaining member and the body, said back of the body having holes accommodating the bolts and an inside recess for the bolt heads.

4. The clamp of claim 3 wherein: the body and retaining member each have pairs of ears separated with generally right angle recesses for engaging the support.

5. A clamp for connecting a member to a support comprising: a body including a back, sides connected to and extended from the back, leg means connected to the sides opposite the back, and a passageway for receiving a portion of the member between the sides, back and leg means, first holding means engageable with the leg means, and second holding means engageable with at least one side and the member for holding the member in a fixed position relative to the body, and means for connecting the body to the support, said first holding means comprising at least one nut and bolt assembly having a bolt projected through a hole in the leg means and a nut on the inside of the leg means, said second holding means comprising nut and bolt assemblies having bolts projected through holes in said one side of the body and nuts adjacent the inside of the one side of the body, said body having spaced shoulder for limiting rotation of the nut of the first holding means and means extended from the inside of said one side of the body adjacent opposite portions of the nuts on the second holding means to limit rotation of said nuts of the second holding means.

6. The clamp of claim 1 wherein: the second holding means comprise nut and bolt assemblies having bolts projected through holes in both sides of the body toward the member and nuts on the insides of said sides, said bolts threaded through said nuts and in engagement with the sides of the member to fix the position of the member relative to the body, said body having means for limiting the rotation of said nuts.

7. The clamp of claim 1 wherein: the first holding means is generally normally disposed with respect to the second holding means.

8. A clamp for connecting a member to a support comprising: a body including a back, sides connected to and extended from the back, leg portions connected to the sides opposite the back, and a passageway for receiving a portion of the member between the sides, back and leg portions, first holding means engageable with the leg portions and the member for holding the member in engagement with the back and second holding means engageable with at least one side and the member for holding the member in a fixed position relative to the body, and means for connecting the body to the support, said body having a pair of generally aligned leg portions connected to the sides, said back having spaced shoulder engageable with the member, said first holding means operable to hold the member in engagement with said shoulders.

9. The clamp of claim 8 wherein: said body includes a recess between said shoulders, said means connecting the body to the support including bolts having heads located in said recess, said bolts being removable from said body through the passageway extended through said body and the space between the leg portions.

10. A clamp for connecting a member to a support comprising: a body including a back, sides connected to an extended from the back, leg portions connected to the sides opposite the back, and a passageway for receiving a portion of the member between the sides, back and leg portions, first holding means engageable with the leg portions and the member for holding the member in engagement with the back and second holding means engageable with at least one side and the member for holding the member in a fixed position relative to the body, and means for connecting the body to the support, said body comprising a one-piece cast metal member having substantially parallel sides joined to a back and spaced leg portions, said passageway being open between said leg portions and at the opposite edges of said sides, said first holding means comprising first nut and bolt assemblies having bolts projected through holes in the leg portions and nuts located on the inside of the leg portions, said body having spaced shoulders adjacent said nuts to limit the rotation of the nuts, said second holding means comprising second nut and bolt assemblies having bolts projected through holes in one side of the body and nuts on the inside of said one side, said side having spaced ribs engageable with said latter nuts to limit rotation of the nuts.

11. The clamp of claim 10 wherein: said second holding means comprise a pair of spaced second nut and bolt assemblies, said side having separate pairs of spaced inwardly directed ribs engageable with the nuts of the second nut and bolt assemblies.

12. The clamp of claim 10 wherein: said means for connecting the body to the support comprise a retaining member and nut and bolt assemblies coupling the retaining member to the body with the support located between the retaining member and the body, said back of the body having holes accommodating the bolts and an inside recess for the bolt heads.

13. The clamp of claim 12 wherein: the body and retaining member each have pairs of ears separated with generally right angle recesses for engaging the support.

14. The clamp of claim 10 wherein: said back has spaced second shoulders engageable with the member, aid first holding means being operable to hold the member in engagement with said second shoulders.

15. The clamp of claim 14 wherein: said body includes a recess between said second shoulders, said means connecting the body to the support including bolts having heads located in said recess, said bolts being removable from said body through the passageway extended through said body and the space between the leg portions.

* * * * *